(12) United States Patent
Nicola

(10) Patent No.: US 7,404,828 B1
(45) Date of Patent: Jul. 29, 2008

(54) METHOD FOR THE PRODUCTION OF PARTICLES

(75) Inventor: Mazin Nicola, Worthing (GB)

(73) Assignee: Glaxo Group Limited, Brentford, Middlesex (GB)

( * ) Notice: Subject to any disclaimer, the term of this patent is extended or adjusted under 35 U.S.C. 154(b) by 423 days.

(21) Appl. No.: 10/130,204

(22) PCT Filed: Nov. 15, 2000

(86) PCT No.: PCT/GB00/04350

§ 371 (c)(1),
(2), (4) Date: May 15, 2002

(87) PCT Pub. No.: WO01/36078

PCT Pub. Date: May 25, 2001

(30) Foreign Application Priority Data

Nov. 16, 1999 (GB) ................... 9927011.8

(51) Int. Cl.
*B01D 9/00* (2006.01)

(52) U.S. Cl. ....................................... 23/297

(58) Field of Classification Search ............... 23/297, 23/299, 306, 307
See application file for complete search history.

(56) References Cited

U.S. PATENT DOCUMENTS

| 3,932,943 | A | | 1/1976 | Briggs et al. | |
| 5,470,442 | A | * | 11/1995 | Mahler et al. | 203/56 |
| 5,481,058 | A | | 1/1996 | Blackwell et al. | |
| 5,665,798 | A | * | 9/1997 | Speaks et al. | 524/14 |
| 5,770,559 | A | | 6/1998 | Manning et al. | |
| 6,572,831 | B1 | | 6/2003 | Nicola | 422/256 |

FOREIGN PATENT DOCUMENTS

| WO | WO 96/01221 | 1/1995 |
| WO | WO 96/00610 | 1/1996 |
| WO | WO 96/29998 | 10/1996 |
| WO | WO 9858722 | 12/1998 |
| WO | WO 99/59710 | 11/1999 |
| WO | WO 01/03821 | 1/2001 |

OTHER PUBLICATIONS

Ind. Eng. Chem. Res. 1998, 37, 1821-1826 Highly Efficient Additive for Isotactic PP Marco et al.
Ind. Eng. Chem. Res. 1999, 38, 3898-3902 Precipitation of Polystyrene by Spraying Polystyrene-Toluene Solution into Compressed HFC-134a Chung-Sung Tan and Hung-Yuan Lin.
J. App. Polymer. Sci., 2001, 84, 1657-1668 Formation of Micron-Sized Cycloolefin Copolymer from Tolunene Solution Using Compressed HFC-134a as Antisolvent, Ren-Yong Hsu, Chung-Sung Tan, Jen-Min Chen.
U.S. Appl. No. 11/293,399; Nicola.
U.S. Appl. No. 10/494,962; Nicola.

* cited by examiner

*Primary Examiner*—Edward M Johnson
(74) *Attorney, Agent, or Firm*—Andrea W. Burke; Theodore R. Furman; Charles M. Kinzig

(57) ABSTRACT

A method of preparing particles of a substance, for example selected from a flavor, fragrance, pigment, dye, biologically active compound or a plastics material, comprises contacting the substance of a formulation (which may include the substance in conjunction with a second solvent) with a first solvent which comprises a C1-C4 hydrofluorocarbon, especially tetrafluoroethane, and subjecting the resultant mixture to a separation process, for example, by allowing the mixture to be sprayed as a mist (14) from a high pressure environment in a first vessel (2) to a low pressure environment in a second vessel (8), thereby to cause separation of a least some of the substance from the first solvent and the formation of fine particles (20) of the substance.

27 Claims, 1 Drawing Sheet

METHOD FOR THE PRODUCTION OF PARTICLES

FIELD OF THE INVENTION

The present invention relates to the production of particles and, in particular, but not exclusively, to the production of particles having a controlled size and/or defined crystalline form.

BACKGROUND OF THE INVENTION

Many industries require that their solid particulate raw materials meet rigorous specifications as to size and shape. Some require very small particles or crystals with closely defined limitations as to the range of size and shape.

In the food industry, it would be advantageous to obtain raw materials as solid particulate powders having very small, narrowly distributed mesh sizes in order to distribute more evenly the flavour ingredient throughout their prepared foodstuff products.

Industries concerned with colour in the form of dye-stuffs and pigments need small, uniform, closely defined particulate materials, to distribute better and more evenly such dyes and pigments in suspension or solution throughout their paints, printing inks and textile printing media.

The plastics industry also has need for very small particles of a variety of polymeric materials such as polystyrene, polyvinyl chloride, polyacrylamide etc.

The property known as polymorphism is the ability of crystalline materials to exist in a variety of forms or structures despite being chemically indistinguishable from each other. The crystalline form or structure may have an effect on the properties of the material. In view of this, in addition to the control of the particle size (mesh) of their raw materials, some industries require crystals of very well defined shape to the rigorous exclusion of similarly sized crystals of other shapes.

The chemical and pharmaceutical industries have a particular demand for small particles for a wide range of applications. For example, small particle size raw ingredients and intermediates are advantageous for their increased ease of dissolution, enhanced chemical reactivity and increased ease of drying.

The pharmaceutical industry in particular has a significant requirement for use of particles of controlled size in drug formulations. There are several methods available for provision of controlled drug delivery systems. Particle size and crystal form are important characteristics affecting the performance and efficacy of ingested pharmaceuticals, whether as tablets, powders or suspensions. Small particles of microcrystalline form, due to their large surface area, are absorbed more quickly than larger particles and hence have a faster activity. The reverse is also true. Therefore, the release rate of active ingredients can be controlled by controlling the size of the particles from which the pharmaceutical is made.

Particle size control is also important in situations where a drug is delivered through the skin in, for example, the provision of painkillers and vaso-dilators, such as capsicum extracts, used as a means of treating and accelerating the healing of sprains and muscular damage. Suppositories, which depend for their efficacy on the ability of the active pharmaceutical to penetrate through the rectal mucosa, have proved to be a valuable means for the administration of drugs. The opinion that "skin-patches" comprising or impregnated with pharmaceutically active compounds may have considerable advantages has been growing in popularity in recent years. Hormone replacement therapy patches and nicotine patches are now a widely used and effective means for the delivery of active molecules through the epidermis.

In some applications where prolonged drug delivery is desired, such as in certain common cold preparations, a mixture of variously sized particles is used in order that the therapeutic benefits last for extended periods of time.

Traditionally, milling or grinding of a solid material was considered to be an adequate means for causing attenuation or reduction in the particle size of a solid material. Micronization improved this technique, yielding even smaller particles.

Unfortunately, all forms of mechanical grinding, milling, micronizing or attrition of solids to powders result in the destruction of the crystal form and in the introduction to the powder of heat energy with an inevitable rise in temperature of the solid. This may (at best) have no effect on the pharmacologically active ingredient. However, it may in some cases cause a reduction in the efficacy of a preparation containing the active ingredients.

Methods including introducing liquid nitrogen or solid carbon dioxide to the grinding surfaces, collectively known as "freeze grinding", have gone some way to alleviating and evading such rises in temperature, by removing the heat almost as fast as it is generated. However, even this process can never be performed without destruction of the crystalline form of a material.

Another means for the production of small particles from solutions of a compound is "spray drying". This process has been widely used for over forty years as a means of producing small particles of the water soluble solids of coffee liquor to yield the product known as "instant coffee".

According to this technique, a hot (frequently superheated) aqueous solution containing the compound, is injected at high velocity into a large chamber through an "atomiser" or orifice, with the intention of producing very small droplets. The droplets fall under the influence of gravity whilst encountering a spiral and rising stream of warm dry air, injected into the chamber at the base thereof. As the warm air passes up through the chamber counter-current to the falling droplets of solution, heat is exchanged, and, drying of the droplets occurs. The resultant dry powder is harvested from the bottom of the chamber for further processing.

This process has disadvantages that prevent wide-scale use for the general preparation of small particles of some compounds, for example, pharmaceutically active ingredients. The introduction of heat to the injected liquor could cause decomposition of a pharmaceutically active ingredient. Exposure to air could result in the oxidation of a component. Furthermore, all components desired to be produced by this method are required to be prepared in aqueous solution, which can be difficult, if not impossible, for some components. In addition, atomisation of the formulation combined with heat and rapid drying often introduces static energy into the particles, thus increasing the risk of fire and causing the particles to be hygroscopic.

In recent years, a technique analogous to spray-drying, but using super-critical carbon dioxide fluid as a solvent has been under intense scrutiny by many industries.

This technique relies on the curious property of carbon dioxide (at temperatures above its critical temperature of 31° C.) and at very high pressures (in the region of 100 to 400 Bar) to "dissolve" certain pharmaceuticals and other materials such as essential oils, fragrances and flavours. To use this procedure for the production of very small particles, a solute (e.g. the active pharmaceutical) is placed in a chamber capable of withstanding pressures in excess of 300-500 Bar. The chamber and contents are heated to typically 30-40° C. and the solute is contacted with and subjected to a flow of carbon dioxide at pressures that are typically 100-400 Bar. Some of the solute appears to "dissolve" in this super-critical fluid stream.

If the super-critical solution stream is allowed to emerge into a second chamber, wherein the pressure is maintained at a lower level or even at atmospheric pressure, the dissolving properties of the carbon dioxide are reduced or eliminated and a cloud of very fine particles of solute is formed as a mist. It is sometimes possible to harvest this mist and thereby make a preparation of very finely divided solute.

One-major disadvantage of this procedure is its cost; the capital cost of the various chambers, pumps, nozzles, heat exchangers etc., all of which must be capable of withstanding and functioning under very high pressures indeed, is extremely high.

Furthermore, carbon dioxide, being an acidic gas, can cause reductions in pH of the solute, in the presence of water, to unacceptably low levels.

It is an object of the present invention to address problems associated with the production of solid particles.

DETAILED DESCRIPTION OF THE INVENTION

Figure 1:
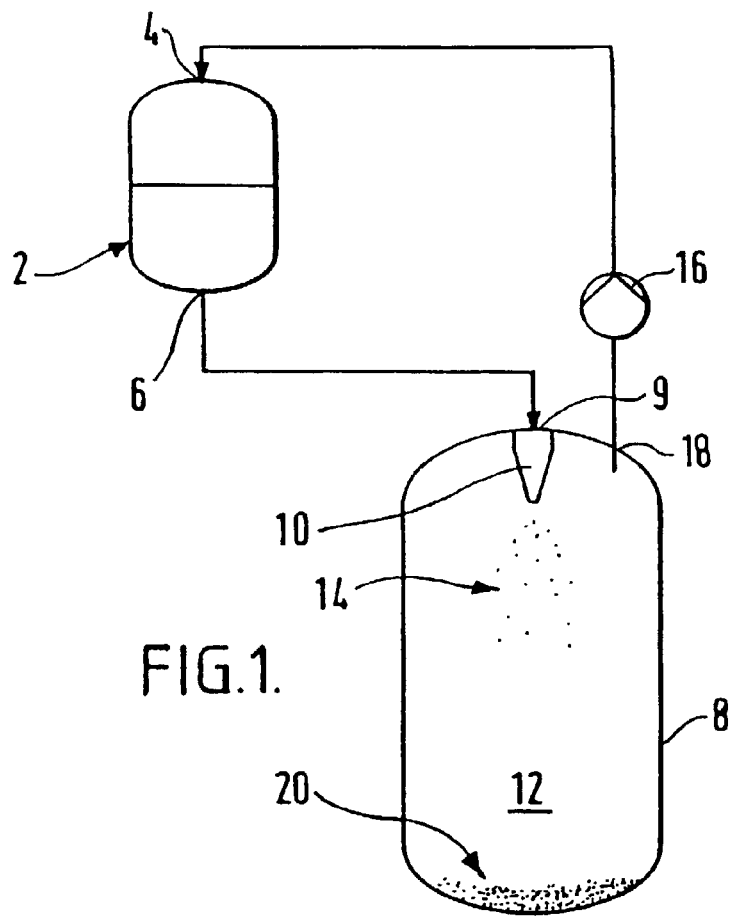
FIG. 1 is a schematic illustration of a first embodiment of apparatus suitable for carrying out the present invention.

According to the present invention there is provided a method of preparing particles of a substance, comprising contacting said substance or a formulation comprising said substance with a first solvent which comprises a $C_1$-$C_4$ hydrofluorocarbon, and subjecting the resultant mixture to a separation process which causes separation of at least some of the substance from the first solvent.

Preferably, said $C_1$-$C_4$ hydrofluorocarbon includes no chlorine atoms. Preferably, it comprises one or more carbon, fluorine and hydrogen atoms only. Preferably, said hydrofluorocarbon is a $C_1$-$C_3$, more preferably a $C_1$-$C_2$ hydrofluorocarbon. Especially preferred is a $C_2$ hydrofluorocarbon.

Said hydrofluorocarbon may include up to 10, preferably up to 8, more preferably up to 6, especially up to 4, fluorine atoms. Preferably, said hydrofluorocarbon includes at least 2, more preferably at least 3, fluorine atoms.

Said hydrofluorocarbon is preferably aliphatic. It is preferably saturated.

Said hydrofluorocarbon may have a boiling point at atmospheric pressure of less than 20° C., preferably less than 10° C., more preferably less than 0° C., especially less than −10° C. The boiling point may be greater than −90° C., preferably greater than −70° C., more preferably greater than −50° C.

A preferred hydrofluorocarbon is tetrafluoroethane, with 1,1,1,2-tetrafluoroethane (also known as HFC 134A) being especially preferred. HFC 134A boils at −26° C. at atmospheric pressure and has a vapour pressure at 20° C. of 5 BarG. It is chemically inert, being neither acidic nor alkaline, non-flammable, non-toxic and non-ozone depleting. HFC 134A has a very low viscosity (0.22 centipoise) and can, therefore, be pumped at great velocity with very high turbulence and sheer through very small orifices with modest applications of pressure. The gaseous solvent can easily be re-compressed back to a liquid and can be recovered virtually completely for re-cycling.

Although substantially pure HFC 134A may be used in some applications, since it is a very poor solvent, it may be mixed with small quantities of other co-solvents to adjust the salvation properties.

Thus, said first solvent may include a co-solvent, which may also be, but is preferably not, a hydrofluorocarbon of the type described herein. Said co-solvent is suitably selected to affect the boiling point and/or dissolution properties of the $C_1$-$C_4$ hydrofluorocarbon for said substance and/or the formulation comprising said substance.

The co-solvent may be selected from $C_{2-6}$ hydrocarbons, which may be alicyclic or aliphatic. They are preferably alkanes or cycloalkanes such as ethane, n-propane, i-propane, n-butane or i-butane.

The co-solvent may also be a hydrocarbon ether, particularly a dialkylether, such as dimethyl ether, methyl ethyl ether or diethyl ether.

The co-solvent may also be a hydrocarbon with polar properties, such as those with dielectric constants of greater than 5. Suitable dielectric hydrocarbon co-solvents include alcohols, for example methyl, ethyl and isobutyl alcohols, and ketones, such as acetone.

Suitably, said first solvent comprises a major portion of said $C_1$-$C_4$ hydrofluorocarbon. Preferably, at least 90 wt %, more preferably at least 93 wt %, especially at least 97 wt % of said first solvent is comprised by said $C_1$-$C_4$ hydrofluorocarbon. The balance may be made up of one or more co-solvents as described above. Where said first solvent includes a co-solvent, it may comprise 1-50 wt %, preferably, 2-30 wt % and more preferably 2-20 wt % co-solvent.

Preferably, the co-solvent forms an azeotropic mixture with the $C_{1-4}$ hydrofluorocarbon so that its proportion in the first solvent will remain constant even though the first solvent is redistilled many times.

Where a formulation comprising said substance is contacted in the method, said formulation may be a solution. The solution may be a true solution or a colloidal solution. The colloidal solution may be a sol, emulsion, gel or other colloidal matrix.

Said formulation suitably includes a second solvent which includes an organic solvent. Preferably, the substance is soluble in the second solvent.

Suitable second solvents include alcohols, especially aliphatic alcohols such as methanol, ethanol, 1-propanol or 2-propanol; ketones, especially aliphatic ketones, with dialkyl ketones such as acetone or methyl isobutyl ketone being preferred; organic acids, preferably acetic acid; amides, such as N,N'-dialkylamide or alkylamide; carboxylic acid derivatives, for example, anhydrides such as acetic anhydride; cyanide derivatives, for example, hydrogen cyanide or any alkyl cyanide; ammonia; sulphur containing molecules; acetates, with methyl acetate, ethyl acetate and butyl acetate being preferred; ethers, with dimethyl ether and diethyl ether being preferred; alkanes or alkane derivatives, with dichloromethane and dichloroethane being preferred; tetrahydrofuran; toluene; hexane; heptane and petroleum ether mixtures.

The second solvent may comprise a combination of two or more of the above, in any ratio.

Preferably, the second solvent is miscible with the first solvent.

The separation process may include passing the resultant mixture from a first region at pressure $P_1$ to a second region at pressure $P_2$, wherein $P_1$ is greater than $P_2$ Contact between the substance or formulation and the first solvent may be achieved in a stirred chamber, or preferably for a formulation comprising the substance, in an inline mechanical or static mixer. A suitable inline mixer comprises two concentric tube arrangements, the formulation being fed though one tube and the first solvent being fed through the other. Suitably, the formulation is fed through the outer tube and the first solvent is fed through the inner tube. The outlet end of the inline mixer may be designed to effect contact between the formulation and the first solvent.

The method of introduction of the mixture into the second chamber can be used to control the particle size of the resultant particulate substance.

Preferably, the mixture is sprayed into the second region, for example, by means of a nozzle or atomiser. The mixture may be sprayed through a fine nozzle to produce a mist of small droplets in the second region. The size of the droplets produced may be used, amongst other things, to control the size of the particles produced.

Preferably, the second region comprises a chamber at pressure $P_2$. In this case, the mixture is suitably introduced into the upper half of the chamber.

Spraying the resultant mixture into a second region of reduced pressure compared to the first region, causes evaporation of the $CIC_4$ hydrofluorocarbon and thereby separation of at least some of the substance from the $C_1$-$C_4$ hydrofluorocarbon.

If the substance is in a formulation which includes a second solvent, the second solvent is suitably separated from the substance by means of the first solvent. Preferably, the $C_1$-$C_4$ hydrofluorocarbon effects mass transfer of the second solvent thereinto. Therefore, when the $C_1$-$C_4$ hydrofluorocarbon is separated from the substance the second solvent is simultaneously separated from the component. Thus the substance precipitates out of solution to form solid particles.

Suitably, the majority of the first solvent evaporates. Preferably, substantially all of the first solvent is separated from the substance during the separation process. If the substance is in a formulation, suitably, the majority, and preferably substantially all, of the second solvent is separated from the substance during the separation process.

Evaporation of the first solvent may be aided by supplying heat, equivalent to the latent heat of vaporisation of the first solvent, to the second region or to the nozzle.

Suitably, the particles of the substance collect on the floor of the chamber of the second region.

The vaporised first solvent is preferably removed from the second region via a first outlet. If the second region comprises a chamber, the first outlet is suitably situated towards the top of the chamber.

If the substance is in a formulation which includes a second solvent, the second solvent is suitably removed from the second region via the same outlet as the first solvent. Alternatively, the second solvent may be removed from the second region by means of a different outlet from the first solvent.

The substance may be insoluble or sparingly soluble in the first solvent. Preferably, the solubility of the substance in the first solvent is less than 20% w/w, more preferably less than 10% w/w, especially less than 5% w/w, most especially less than 2% w/w. Preferably, the solubility of the substance in the first solvent is only up to 1%, more preferably only up to 0.5%, especially only up to 0.3%, most especially only up to 0.1%.

If the substance is only sparingly soluble in the second solvent and/or the first solvent then each droplet of the mixture sprayed into the second region will comprise only a limited amount of the substance. Therefore, the particles of the substance precipitated out from each droplet will be of small size.

Washing of the separated substance with further supplies of first solvent and subsequent drying may provide the substance as a powder of crystals of a very narrow range of particle sizes and a specific morphologically discrete structure, form and shape.

The process described may have widespread applications for the preparation of particles of many different substances. Preferably, the substance is an active ingredient selected from flavours, fragrances, plastics, pigments, dyes and biologically active compounds such as pharmaceuticals, synthetic and semi-synthetic drugs and pesticides.

The method also facilitates the simple, efficient and complete removal for recovery and recycling for re-use of all of the hydrofluorocarbon and/or co-solvent of said first solvent from both the crystalline product and the washings thereof. Furthermore, all the second solvent that may originally be used to dissolve the substance can be recovered from the original supernatant or filtrate and washings from which the crystals are harvested, for subsequent re-use. The separation of the substance may take place in a single step or in multiple steps of contact and separation. The technique of varying physical parameters such as temperature, sheer, amount of first solvent, relative concentration of solute/solvents, the relative compositions of the solvent mixture and ratio of second solvent to first solvent may optionally be used in any or all of these steps.

Particles as small as 2 microns may be produced in accordance with the present invention. However, the size of particles produced in accordance with the present invention may be influenced to produce particles of any desired size by varying or controlling the following parameters, for example:

1. The concentration of substance in the formulation.
2. The composition of the first solvent.
3. The ratio of substance or formulation to first solvent.
4. The rate of evaporation of the first solvent.
5. Temperature.
6. Pressure difference between the first and second regions.
7. Liquid flow rate(s).
8. Design of nozzles or atomisers and the chamber shape.

Crystal type, size and uniformity may be influenced by control of the following parameters:

1. Temperature.
4. Method and efficiency of stirring.
5. Concentration of the substance in the formulation.
6. Co-solvent type and concentration.
7. Flow rates.
8. Flow ratios.

Advantageously, the present invention allows for production of particles having a controlled crystal habit. The present invention also provides a method of producing small particles.

The invention extends to particles of a substance prepared in a method as described herein. Such particles may include traces of residual first solvent. Thus, the invention further extends to particles of a substance which includes traces of a said first solvent as described herein.

The present invention will now be illustrated, by way of example only, with reference to the following drawings, in which:—

FIG. 1 shows a first vessel 2 having an inlet 4 at its upper end and an outlet 6 at its lower end. Suitably, a filtration grid (not shown) is placed over the outlet 6. Vessel 2 may also be equipped with a motor driven stirrer (not shown), or other suitable agitation means.

The outlet of the first vessel 2 is connected to the inlet 9 of a second vessel 8, which inlet 9 is provided with a nozzle 10.

A compressor 16 is fitted with its inlet connected to an outlet 18 of the second vessel 8, which outlet 18 is located in the region of the top of the second vessel 8. The outlet of the compressor 16 is connected to the inlet 4 of the first vessel 2.

The whole apparatus is connected via a network of pipes, pressure and temperature gauges, flow and pressure control valves and a condenser to facilitate selection and maintenance of optimum critical parameters of flow, temperature and pressure in each part of the apparatus.

The apparatus of FIG. 1 may be used for preparing small particles of a substance. To this end, the substance is charged into vessel 2 and mixed with an HFC to prepare a solution or slurry. The mixture is then filtered as it is allowed to exit vessel 2 via outlet 6. It passes through nozzle 10 whereby it is sprayed into the chamber 12 of the second vessel 8 in the form of a fine mist of droplets, generally designated by reference numeral 14.

As a result of the reduced pressure in the second vessel 8, the HFC evaporates from each droplet leaving fine particles generally designated by reference numeral 20 of precipitated substance to fall to the bottom of the vessel 8 for collection.

The evaporated HFC is removed from the second vessel 8 via outlet 18 and is compressed for recycling.

The process can be carried out on a semi-continuous basis, or, by incorporating duplicate vessels, as a fully continuous process.

Optionally, heat can be supplied to the second vessel 8 by conduction via the walls of the vessel 8 or via the nozzle 10. Alternatively, the chamber 12 may be heated by introduction of microwave energy or by directly re-injecting a small, super-heated gaseous stream into the chamber. A suitable hot gaseous stream is readily available from the outlet of the compressor.

Both vessels 2,8 may be jacketed to provide a means of temperature control.

Figure 2:
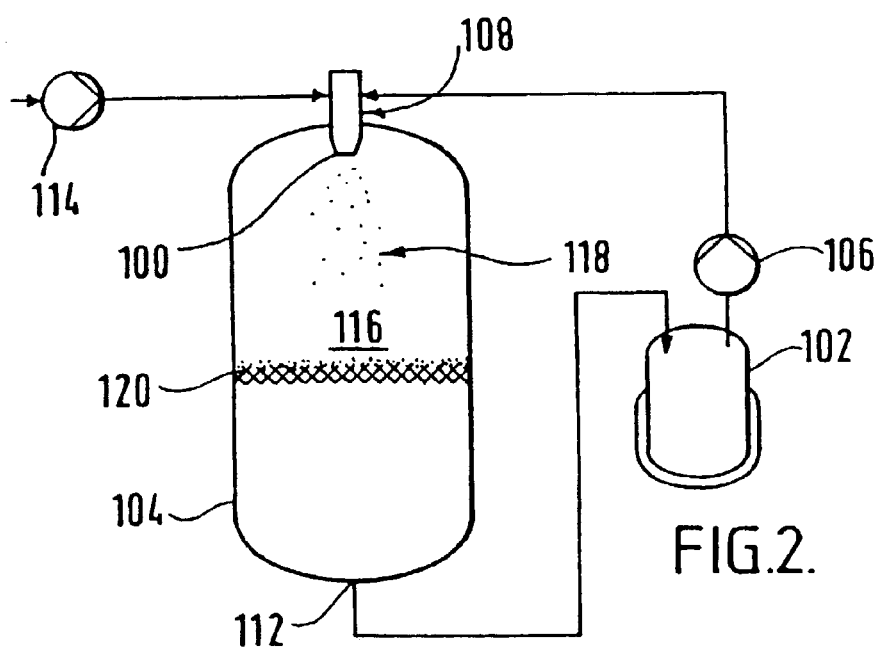
FIG. 2 is a schematic illustration of a first embodiment of apparatus suitable for carrying out the present invention.

FIG. 2 shows a first vessel 102 connected via a compressor 106 and an inline mixer 108 to a second vessel 104.

In operation of the apparatus of FIG. 2, HFC is metered into the first vessel 102. Then it is recycled continuously by evaporation with the aid of the compressor 106. In this regard, the liquefied HFC passes into vessel 104 via the nozzle 100 of the inline mixer 108 and passes via the outlet 112 of vessel 104 back into vessel 102, to effect a continuous cycle.

A formulation comprising a substance to be prepared as small particles in solution with an organic solvent is charged to the inline mixer 108, via pump 114. The HFC and the formulation are contacted in the inline mixer 108, immediately before discharge through the nozzle 100. HFC is found to have a high affinity for organic solvents. Therefore, mass transfer of the organic solvent of the formulation into the HFC occurs immediately on contact in the two substances.

The mixture is sprayed into the chamber 116 of vessel 104 via nozzle 100 to form a mist of fine droplets, generally designated by reference numeral 118. Upon emergence into the reduced pressure environment of chamber 116, the HFC and organic solvent evaporate and the substance precipitates out of solution.

The particles of substance collect on a filter 120 and the HFC/organic solvent pass therethrough.

The HFC is recycled, as described above and the organic solvent is collected in vessel 102.

At the end of the run, the HFC recycling can be maintained for a predetermined time to effect washing of the collected solid by removing any trace contamination of the carrier organic solvent of the formulation.

Examples 1 and 2 described hereafter utilized apparatus and a process based on the embodiments of FIGS. 1 and 2 respectively.

EXAMPLE 1

Phenyl acetic acid (10 g) was charged into a first vessel equipped with an agitator and a glass sinter attached to a bottom outlet.

Keeping the lower outlet of the first vessel closed, 1,1,1,2-tetrafluoroethane (2 kg) was charged into the first vessel. The slurry thus formed was agitated to achieve dissolution of the phenyl acetic acid in the tetrafluoroethane.

The inlet of a gas compressor was fitted to a second (evaporation) vessel and the outlet was fitted to a tetrafluoroethane storage vessel, via a cooling heat exchanger. The gas compressor was activated.

The mixture of phenyl acetic acid in tetrafluoroethane was allowed to flow from the first vessel to the second vessel via a flow restriction device, for example, a small aperture nozzle. The solution flow and temperature in each of the first and second vessels was controlled so that the pressure in the first vessel was maintained at about 6 BarG, and the pressure in the second vessel was maintained at about 0.75 BarG.

The small aperture nozzle causes the mixture of phenyl acetic acid and tetrafluoroethane to be sprayed into the second vessel in the form of a fine mist. As the mixture passes from the first region of higher pressure to the second region of lower pressure, the liquid tetrafluoroethane evaporates causing small particles of phenyl acetic acid to fall to the floor of the second vessel for collection.

EXAMPLE 2

A first 5 liter stainless steel vessel was connected to a liquid/liquid mixing flow cell via a gas compressor. A second 5 liter stainless steel vessel was fitted with a filter element fashioned from a sheet glass sinter at the outlet thereof. The inlet of the vessel was connected to the liquid/liquid mixing flow cell.

Hydrofluorocarbon 134A (HFC) (2 kg) was charged into the first vessel. The compressor was activated, so that the HFC was continuously recycled. The HFC recycling rate was maintained at 300 g/minute.

A solution of lauric acid (50 g) dissolved in acetone (1 liter) was prepared in a third vessel. The lauric acid solution was introduced into the mixing cell using a gear pump at a flow rate of 30 ml/minute.

The HFC contacted the lauric acid solution upon exiting the mixing cell. The mixture was sprayed into the second vessel by means of the mixing cell. Upon contacting the lauric acid solution, the acetone was transferred to the HFC by mass transfer. Upon entry into the second vessel (which was at a lower pressure than the first vessel), the HFC and acetone mixture evaporated producing small particles of lauric acid which fell to the bottom of the second vessel for collection.

Critical parameters of temperature, pressure and flow rates were maintained constant throughout the experiment.

The HFC flow was continued for 5 minutes after the whole of the batch of lauric acid solution had been metered into the second vessel. The HFC was then recovered by diverting the flow into a storage cylinder. The acetone was recovered separately. The apparatus was then dismantled to recover lauric acid, which had collected at the bottom of the second vessel as dry, fine particles of uniform size.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of preparing particles of a substance, comprising:
    contacting said substance with a first solvent which is a $C_{1-4}$ hydrofluorocarbon in the liquid state, said hydrofluorocarbon including no chlorine atoms and having a boiling point of greater than −50° C. to form a solution of said substance in said first solvent at a pressure P1 and subjecting said solution of said substance to a separation process which causes separation of at least some of said substance from the first solvent, said separation process comprising spraying the solution of said substance through a nozzle from said first region at a pressure $P_1$ into a second region at a pressure $P_2$, wherein $P_1$ is greater than $P_2$ to produce a mist of small droplets of said solution of said substance in said second region at the pressure $P_2$ so that said first solvent evaporates from said solution of said substance in said second region so that solid particles of said substance form as a result of said evaporation; and collecting said solid particles.

2. A method according to claim 1, wherein said hydrofluorocarbon is a $C_{1-3}$ hydrofluorocarbon.

3. A method according to claim 2, wherein said hydrofluorocarbon has a boiling point at atmospheric pressure of less than 20° C.

4. A method according to claim 3, wherein said hydrofluorocarbon is tetrafluoroethane.

5. A method according to claim 4, wherein said hydrofluorocarbon is 1,1,1,2-tetrafluoroethane.

6. A method according to claim 1, wherein said first solvent includes a co-solvent.

7. A method according to claim 6, wherein said co-solvent is selected from C $C_{2-6}$ hydrocarbons, hydrocarbon ethers, and hydrocarbons with polar properties.

8. A method according to claim 6, wherein said co-solvent forms an azeotropic mixture with the $C_{1-4}$ hydrofluorocarbon.

9. A method according to claim 1, wherein heat is applied to the second region or a nozzle used to spray the mixture into the second region in order to aid evaporation of the first solvent.

10. A method according to claim 1, wherein said substance is insoluble or sparingly soluble in the first solvent.

11. A method according to claim 1, wherein said substance is selected from flavors, fragrances, plastics, pigments dyes and biologically active compounds.

12. A method according to claim 1, wherein said substance is an active ingredient selected from pharmaceuticals, synthetic and semi synthetic drugs and pesticides.

13. A method of preparing particles of a substance, comprising:
    (i) selecting a first solvent which comprises a $C_{1-4}$ hydrofluorocarbon in the liquid state, said hydrofluorocarbon including no chlorine atoms and having a boiling point of greater than −50° C.;
    (ii) selecting a formulation comprising a solution of said substance in a second solvent which comprises an organic solvent and contacting said formulation with said first solvent in an inline mixer to thereby form a mixture of said first solvent and said formulation at a pressure $P_1$, then spraying the mixture through a nozzle from said first region at a pressure $P_1$ into a second region at a pressure $P_2$, wherein $P_1$ is greater than $P_2$, to produce a mist of small droplets of said mixture in said second region at the pressure $P_2$, whereby said second solvent is separated from the substance by means of mass transfer of the second solvent into the first solvent and said first solvent evaporates from said substance so that said substance precipitates out of solution in the form of solid particles; and
    (iii) collecting the solid particles.

14. A method of preparing particles of a substance, comprising:
    selecting a formulation comprising a solution of said substance in an organic solvent and contacting said formulation with a first solvent being a $C_{1-4}$ hydrofluorocarbon in the liquid state, said hydrofluorocarbon including no chlorine atoms and having a boiling point of greater than −50° C., in an inline mixer, to thereby form a mixture of said first solvent and said formulation at a pressure $P_1$, then spraying the mixture through a nozzle from said first region at a pressure $P_1$ into a second region at a pressure $P_2$, wherein $P_1$ is greater than $P_2$, to produce a mist of small droplets of said mixture in said second region at the pressure $P_2$, whereby said second solvent is separated from the substance by means of mass transfer of the second solvent into the first solvent and said first solvent evaporates from said substance so that said substance precipitates out of solution in the form of solid particles.

15. A method of preparing particles of a substance, comprising: contacting a formulation which comprises a solution of said substance in a second solvent being an organic solvent, with a first solvent which is a $C_{1-4}$ hydrofluorocarbon in the liquid state, said hydrofluorocarbon including no chlorine atoms and having a boiling point of greater than −50° C., to form a solution of said substance comprising said substance, said second organic solvent and said first solvent at a pressure P1 and subjecting said mixture to a separation process which causes separation of at least some of said substance from the first solvent, said separation process comprising spraying the solution of said substance through a nozzle from said first region at a pressure $P_1$ into a second region at a pressure $P_2$, wherein $P_1$ is greater than $P_2$, to produce a mist of small droplets of said solution of said substance in said second region at the pressure $P_2$ so that said first solvent evaporates from said solution of said first substance in said second region so that solid particles of said substance form as a result of said evaporation; and collecting said solid particles.

16. A method according to claim 15, wherein said hydrofluorocarbon is a $C_{1-3}$ hydrofluorocarbon.

17. A method according to claim 16, wherein said hydrofluorocarbon has a boiling point at atmospheric pressure of less than 20° C.

18. A method according to claim 17, wherein said hydrofluorocarbon is tetrafluoroethane.

19. A method according to claim 18, wherein said hydrofluorocarbon is 1,1,1,2-tetrafluoroethane.

20. A method according to claim 15, wherein said first solvent includes a co-solvent.

21. A method according to claim 20, wherein said co-solvent is selected from C $C_{2-6}$ hydrocarbons, hydrocarbon ethers, and hydrocarbons with polar properties.

22. A method according to claim 20, wherein said co-solvent forms an azeotropic mixture with the $C_{1-4}$ hydrofluorocarbon.

23. A method according to claim 15 wherein said second solvent is separated in a separation process which comprises mass transfer of the second solvent into the first solvent.

24. A method according to claim 15 wherein heat is applied to the second region or a nozzle used to spray the mixture into the second region in order to aid evaporation of the first solvent.

25. A method according to claim 15 wherein said substance is insoluble or sparingly soluble in the first solvent.

26. A method according to claim 15 wherein said substance is selected from flavors, fragrances, plastics, pigments dyes and biologically active compounds.

27. A method according to claim 15 wherein said substance is an active ingredient selected from pharmaceuticals, synthetic and semi synthetic drugs and pesticides.

* * * * *